(12) United States Patent
Jadaud et al.

(10) Patent No.: US 6,727,434 B2
(45) Date of Patent: Apr. 27, 2004

(54) ACCESSORY FOR TRUNKING COMPRISING LENGTHS OF TRUNKING WITH DIFFERENT HEIGHTS

(75) Inventors: Alain Jadaud, Tennie (FR); Raphaël Decore, Saint Aubin le Locquenay (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 10/195,067

(22) Filed: Jul. 15, 2002

(65) Prior Publication Data

US 2003/0010525 A1 Jan. 16, 2003

(30) Foreign Application Priority Data

Jul. 13, 2001 (FR) .............................. 01 09377

(51) Int. Cl.⁷ ................................ H01B 7/00
(52) U.S. Cl. ................ 174/135; 174/68.1; 174/68.3; 174/72 A; 439/207; 52/220.5; 52/220.7
(58) Field of Search .................. 174/48, 49, 68.1, 174/68.3, 72 A, 72 C, 135, 97, 96; 52/220.1, 220.3, 220.5, 220.7; 220/3.2, 3.6; 439/207

(56) References Cited

U.S. PATENT DOCUMENTS

| | | | | |
|---|---|---|---|---|
| 4,017,137 A | * | 4/1977 | Parks | 439/135 |
| 5,614,695 A | * | 3/1997 | Benito Navazo | 174/48 |
| 6,259,020 B1 | * | 7/2001 | Ashline et al. | 174/48 |
| 6,380,488 B1 | * | 4/2002 | Takeda et al. | 174/135 |
| 6,444,903 B2 | * | 9/2002 | Saeki et al. | 174/135 X |

FOREIGN PATENT DOCUMENTS

EP           0 776 078 A1      5/1997

* cited by examiner

*Primary Examiner*—Dhiru R Patel
(74) *Attorney, Agent, or Firm*—Young & Thompson

(57) ABSTRACT

The trunking accessory makes up trunking including two or more juxtaposed lengths with different heights each including a base section with two parallel lateral flanges. The accessory includes two or more cheeks adapted to be attached to the lateral flanges, and each cheek includes members for mounting a length of cover section that extend along a line with two or more opposite curves to establish continuity between members for mounting a length of cover section situated at two different heights.

17 Claims, 14 Drawing Sheets

ACCESSORY FOR TRUNKING COMPRISING LENGTHS OF TRUNKING WITH DIFFERENT HEIGHTS

BACKGROUND OF THE INVENTION

1. Field of the Invention

The present invention relates to a trunking accessory for making up trunking comprising two or more juxtaposed lengths with different heights, each length of trunking including a base section provided with two lateral flanges with rims directed toward each other and including members for mounting a length of cover section.

In the present context, the height of a length of trunking refers to its thickness or its depth, corresponding to the height of its lateral walls.

In the present context, the expression "juxtaposed lengths" refers to lengths that follow on from each other without necessarily being in contact, so that they can be separated by a plate.

2. Description of the Prior Art

It can be beneficial to modify the height of trunking along its path, in particular to reduce the cost of an electrical installation, since it may prove necessary to use deep trunking at the head end of an electrical installation, to accommodate all of the electrical power supply conductors and/or cables of the installation, whereas, toward the outlying ends of the installation, the trunking used can be shallower and, more generally, smaller.

It can also be beneficial to change the height of trunking to accommodate locally therein an electrical device on top of the volume provided inside the trunking for running electrical power supply conductors and/or cables, without encroaching this volume.

A jointing accessory for establishing continuity between lengths of trunking of different heights is already known to the person skilled in the art. It comprises a molding or casting having the general appearance of a cover with a portion for closing off each length of trunking bordered by lateral skirts, each of its ends having the same dimensions as one of the two lengths of trunking, in order to be connected thereto.

The present invention proposes a new accessory that is inexpensive to produce, compared to the above prior art, which can be fitted to trunking with one-piece or composite base sections, which can serve as a jointing member for joining two base sections with different heights or as a height extender member for increasing the height of a single base section, and which is simple and quick to use, whilst producing an attractive installation and providing limited access to the various compartments of the trunking if the trunking is compartmentalized.

SUMMARY OF THE INVENTION

To be more precise, the invention proposes a trunking accessory for making up trunking comprising two or more juxtaposed lengths with different heights and including a base section provided with two lateral flanges with rims directed toward each other and including members for mounting a length of cover section, wherein the accessory includes two or more cheeks adapted to be attached to the parallel lateral flanges, and each cheek includes members for mounting a length of cover section that extend along a line having at least two opposite curves to establish continuity between members for mounting a length of cover section situated at two different heights so that the accessory allows mounting on the cheeks of a length of cover section adapted to close the base section of the trunking so that the step formed between the juxtaposed lengths with different heights and a portion thereof can be closed by a single length of cover section with no interruption or visible edge or crease at the location of the step.

In a first embodiment of the accessory according to the invention the opposite curves are adjacent.

In a second embodiment of the accessory according to the invention the opposite curves are separated from each other by a rectilinear portion.

In another embodiment of the accessory according to the invention, for establishing continuity between two lengths of trunking having different heights and each including a base section with two lateral flanges, each cheek includes mounting members for attaching it to the base sections at the junction of two juxtaposed lateral flanges of different heights to ensure a continuous wall between the lateral flanges and to establish continuity between the members for mounting a length of cover section on the rims of the lateral flanges situated at different heights.

Another embodiment of the accessory according to the invention includes at least two height extenders each including a rim including members for mounting a length of cover section and members for mounting it on a lateral flange of the base section of the trunking to increase the height of the lateral flange and locally form a length of trunking of greater height than the base section, the cheeks including members for mounting them on the lateral flanges and on the height extenders so that each cheek establishes a continuous wall between a lateral flange of the base section of the trunking and a height extender and continuity between the members for mounting a length of cover section on a rim on a height extender and the members for mounting a length of cover section on a rim on a lateral flange situated at different heights.

This embodiment of the accessory can advantageously comprise a plurality of height extenders with different lengths adapted to be stacked to form a height extender wall of globally pyramidal shape with a step formed at each junction between a first height extender and a second height extender of shorter length, the height extender wall comprising members for mounting a length of cover section and members for mounting it on a lateral flange of the base section of the trunking to increase the height of the lateral flange and a plurality of cheeks each adapted to establish continuity between two successive height extenders with different lengths.

In another embodiment of the accessory according to the invention each cheek comprises members for mounting a length of cover section that extend along a line having two opposite curves at its ends and a rectilinear path between its two ends and members for mounting it on a lateral flange of the base section of the trunking to increase the height of the lateral flange and locally form a length of trunking of greater height than the base section of the trunking, ensuring a continuity of members for mounting a length of cover section between the two heights of the lengths of trunking.

Another embodiment of the accessory according to the invention includes another cheek adapted to establish a continuous wall between two dividing partitions with different heights attached to the back of each base section of the trunking, wherein the other cheek includes a strip ensuring a continuous wall between rims of the dividing partitions in which are mounted the length of cover section for closing the compartment of each base section, and the strip includes members for mounting the length of cover section extending along a line having at least two opposite curves to establish continuity between members for mounting a length of cover section situated at two different heights and to close the step formed between the lengths of trunking of different heights and a portion of each pair of butt-jointed compartments of the lengths of trunking using a single length of cover section with no interruption or visible edge or crease at the location of the step.

Other nonlimiting and advantageous features of the accessory according to the invention are as follows:

the members for mounting a length of cover section provided on each cheek are substantially identical to the members for mounting a length of cover section provided on the rims of the lateral flanges or the dividing partitions of each base section of the trunking;

the members for mounting a length of cover section provided on each height extender are substantially identical to the members for mounting a length of cover section provided on the ribs of the lateral flanges of the base section of the trunking;

the members for mounting a length of cover section provided on the cheeks include members for engaging the lengths of cover section;

the engagement members on each cheek include a groove which ensures continuity of grooves provided on rims situated at different heights;

the members provided on each cheek for mounting a length of cover section include clipping members for clipping the length of cover section;

the clipping members include, for each cheek, a clipping bead which ensures a continuity of clipping beads between clipping beads provided on rims at different heights;

the members for mounting cheeks on the lateral flanges of the base section of the trunking are identical to the members for mounting a length of cover section on the rims of the lateral flanges of the base section of the trunking;

the members for mounting a height extender on a lateral flange of the base section of the trunking are substantially identical to the members for mounting a length of cover section on the rims of a lateral flange of the base section of the trunking; and each cheek has a height that can be modified by cutting off a portion thereof along a particular cutting line to adapt the height of each cheek to those of the lateral flanges of lengths of trunking with different heights.

The following description with reference to the accompanying drawings, which are provided by way of nonlimiting example, explains in what the invention consists and how it can be put into practice.

DETAILED DESCRIPTION OF THE PREFERRED EMBODIMENTS

Note that identical or similar features of the various embodiments shown in the various figures are wherever possible identified by the same reference symbols and are not described again for each new embodiment.

Figure 1:
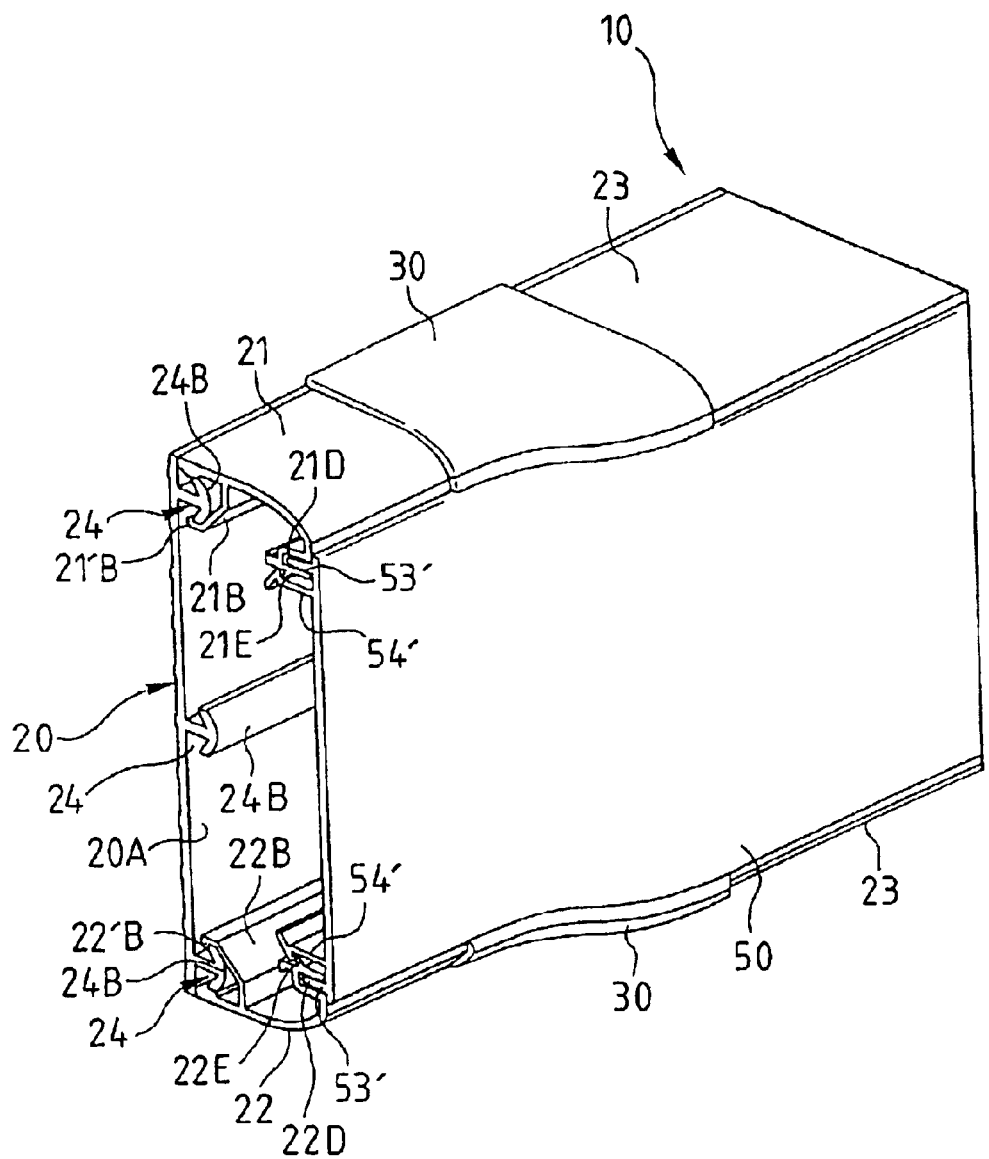
FIG. 1 is a perspective view of a first embodiment of trunking fitted with an accessory according to the invention.
Figure 2:
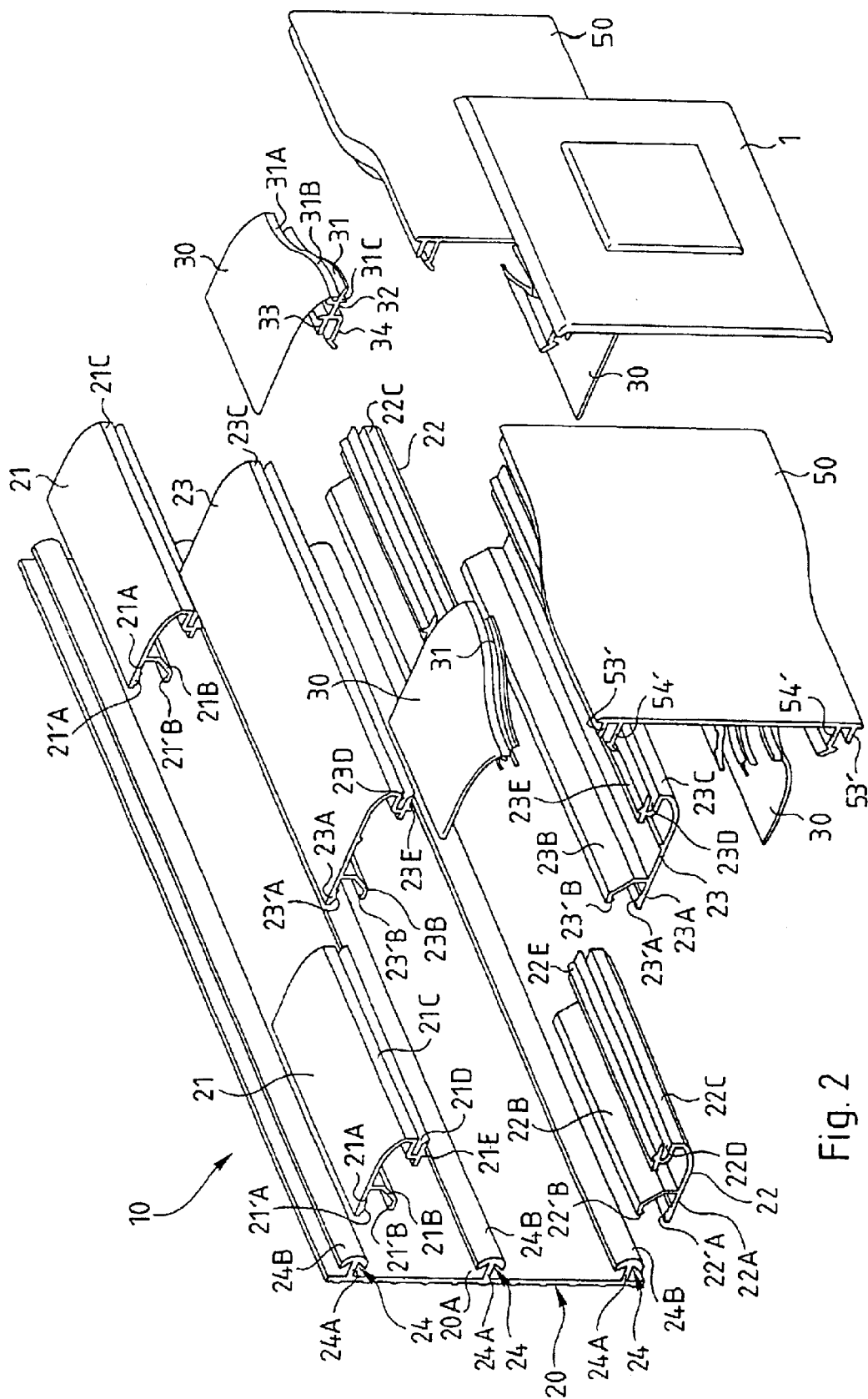
FIG. 2 is a diagrammatic exploded perspective view of the first embodiment of trunking fitted with an accessory according to the invention.
Figure 3:
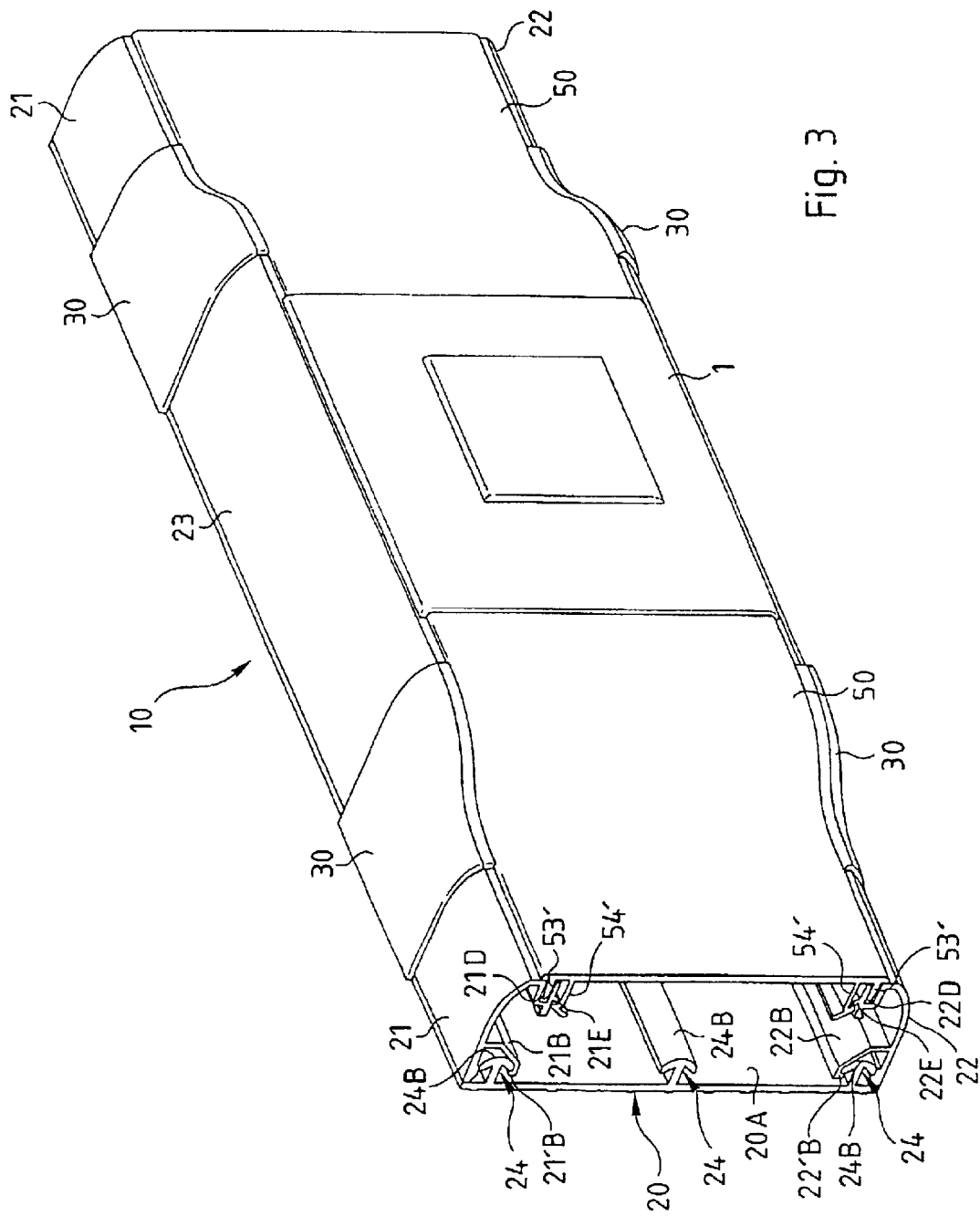
FIG. 3 is a perspective view of the trunking shown in FIG. 2 when assembled.

FIGS. 1 to 3 show composite trunking 10 comprising a base section 20 formed by assembling a back 20A and longitudinal walls 21, 22, 23 by means of cooperating assembly members. The longitudinal walls 21, 22, 23 constitute lateral flanges of the trunking 10.

The back 20A has a longitudinal rib 24 near each of its longitudinal edges with a generally T-shaped section comprising a web 24A and two flanges 24B inclined to the web 24A in the direction of its base.

The back 20A of the base section 20 of the trunking 10 has in the middle another longitudinal rib 24 identical to that near its longitudinal edges and advantageously adapted to be used to mount a partition for separating or dividing the interior space of the base section of the trunking.

Each longitudinal wall 21, 22, 23 has, at a free edge adapted to bear against the back 20A of the base section 20 of the trunking 10, a clamp with two branches 21A, 21B; 22A, 22B; 23A, 23B, and each branch 21A, 21B; 22A, 22B; 23A, 23B has at its free edge a bead 21'A, 21'B; 22'A, 22'B; 23'A, 23'B for clipping it to the inclined flanges 24B of the corresponding longitudinal rib 24.

To this end, at least one branch 21B, 22B, 23B of the clamp of each longitudinal wall 21, 22, 23 is elastically deformable to enable the clamp to be clipped onto the inclined flanges 24B of the longitudinal rib 24 carried by the back 20A.

To be more precise, one branch 21A, 22A, 23A of the clamp of each longitudinal wall 21, 22, 23 is aligned therewith, constituting a portion thereof, and is therefore relatively rigid, and the other branch 21B, 22B, 23B of the clamp of each longitudinal wall 21, 22, 23 comprises a hook-shaped leg having some degree of elastic deformability. The leg 21B, 22B, 23B of the clamp of each longitudinal wall 21, 22, 23 is carried by one face of the corresponding longitudinal wall 21, 22, 23, in this example the interior face.

Furthermore, the flanges 24B of each longitudinal rib 24 are inclined in directions that diverge at an acute angle to the direction of the web 24A of the longitudinal rib 24.

The flanges 24B of each longitudinal rib 24 have curved profiles that merge continuously with the top of the longitudinal rib so that they advantageously form a convex surface oriented in the direction away from the base of the longitudinal rib 24. When each longitudinal wall 21, 22, 23 is fitted to the back 20A of the base section 20 of the trunking 10, this convex surface constitutes a surface for spreading the branches 21A, 21B; 22A, 22B; 23A, 23B of the clamp at the free edge of each longitudinal wall, deforming at least one of the branches and facilitating the clipping of each clamp onto the flanges 24B of the longitudinal rib 24.

The longitudinal walls 21, 22, 23 that constitute the lateral flanges of the base section 20 of the composite trunking 10 have at their other free edge a rim 21C, 22C, 23C oriented toward the interior of the base section 20 of the trunking 10 and incorporating members for mounting a length of cover section 50 of the trunking.

The rims 21C, 23C, 22C on the lateral flanges of the base section 20 of the trunking 10 are directed toward each other and are at right angles to the lateral flanges.

The mounting members for each longitudinal wall 21, 22, 23 include a groove 21D, 22D, 23D formed in the rim 21C, 22C, 23C of the corresponding longitudinal wall 21, 22, 23, and in which engages a longitudinal engagement tongue 531 on the length of cover section 50 near each longitudinal edge, and a clipping bead 21E, 22E, 23E on the external edge of each groove 21D, 22D, 23D and over which clips a clipping tooth on a longitudinal clipping tongue 54' on the length of cover section 50 near each longitudinal engagement tongue 53'.

To limit depression of the length of cover section 50 if a force is exerted on it, each longitudinal engagement tongue 53' of the length of cover section 50 has a length such that its free edge can bear on the bottom of the groove 21D, 22D, 23D formed in the corresponding rim 21C, 22C, 23C of the corresponding longitudinal wall 21, 22, 23.

The lengths of cover section 50 shown in FIGS. 1 to 3 are preshaped with a curved profile so that they can close two juxtaposed lengths of the trunking 10 with different heights by mounting them in the mounting members of the various longitudinal walls 21, 22, 23 situated at different heights.

Figure 14:
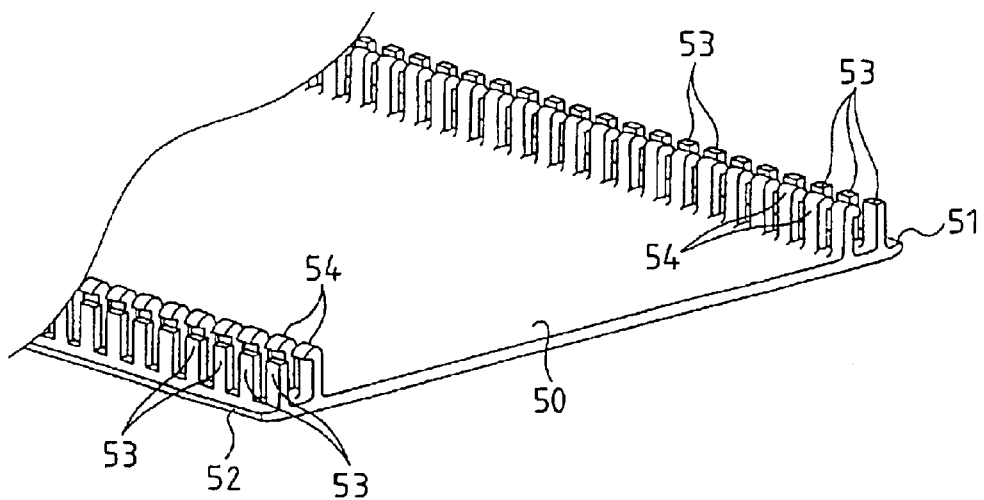
FIG. 14 is a bottom view of a portion of a cover section for the trunking shown in FIGS. 1 to 13.

A preferred embodiment of the length of cover section 50 shown in FIG. 14 has a series of engagement tongues 53 near each of its longitudinal edges 51, 52. Each series of engagement tongues 53 extends along each longitudinal edge 51, 52 and each engagement tongue 53 is perpendicular to the plane of the length of cover section 50.

Each series of engagement tongues 53 is adapted to be engaged, like the longitudinal engagement tongue 53', in each groove 21D, 22D, 23D at the edge of each rim 21C, 22C, 23C of each lateral flange of the base section 20 of the trunking 10.

The length of cover section 50 shown in FIG. 14 has a series of clipping tongues 54 inside and close to each series of engagement tongues 53. Each series of clipping tongues 54 extends parallel to each series of engagement tongues 53 and each clipping tongue 54 is perpendicular to the plane of the length of cover section 50.

Each clipping tongue 54 has a clipping tooth at its free end.

Each series of clipping tongues 54 is adapted to clip onto each corresponding clipping bead 21E, 22E, 23E of each longitudinal wall 21, 22, 23 constituting the lateral flanges of the base section 20 of the trunking 10.

As shown in FIG. 14, the resulting length of cover section 50 advantageously has some degree of flexibility so that it can adapt to a configuration of clipping beads and grooves having a curved path with particular radii of curvature, as explained later.

The trunking 10 shown in FIG. 1 comprises two juxtaposed lengths with different heights. A first length of the trunking 10 is formed by assembling the longitudinal walls 21, 22 to the back 20A of the base section 20, the longitudinal walls 21, 22 having a first height. The juxtaposed second length has a greater height and is formed by assembling the longitudinal walls 23 to the back 20A of the base section 20, the longitudinal walls 23 having a second height greater than the first height.

The trunking 10 shown in FIGS. 2 and 3 comprises three juxtaposed lengths, namely two outermost lengths which are the same height and, between these two outermost lengths, a third length of greater height than the other two.

Each outermost length is formed by assembling longitudinal walls 21, 22 to the back 20A of the base section 20, the longitudinal walls 21, 22 having a first height.

The third length is formed by assembling longitudinal walls 23 to the back 20A of the base section 20, the facing longitudinal walls 23 having a second height greater than the first height.

As shown in FIG. 2, one longitudinal wall 23 of particular length is positioned between two longitudinal walls 21 and the other longitudinal wall 23, which is the same length as the first one, is positioned between two longitudinal walls 22.

In accordance with the present invention, a trunking accessory is advantageously provided at each junction of two juxtaposed lengths with different heights, and the embodiment of the accessory shown in FIGS. 1 to 3 includes two cheeks 30 attached to the parallel lateral flanges of the base section 20 of the trunking, each cheek 30 including members for mounting a length of cover section 50 that extend along a line with two adjacent and opposite curves 31A, 31B to establish continuity between the members 21D, 21E, 23D, 23E, 22D, 22E for mounting a length of cover section situated at two different heights, with the result that the accessory enables mounting on the cheeks 30 of a length of cover section 50 adapted to close the base section 20 of the trunking 10 so that the step formed between the juxtaposed lengths with different heights and a portion of each of the latter is closed by a single length of cover section 50 with no interruption or exposed edge or crease at the location of the step.

The members provided on each cheek 30 for mounting a length of cover section 50 are substantially identical to the members for mounting a length of cover section 50 provided on the rims 21C, 22C, 23C of the longitudinal walls 21, 22, 23 constituting the lateral flanges of the base section 20 of the trunking 10.

Accordingly, the members for mounting a length of cover section 50 provided on the cheeks 30 include, on rims thereof, engagement members for the length of cover section 50 comprising a groove 31 that ensures continuity between the grooves 21D, 23D and the grooves 22D, 23D on the rims 21C, 23C and 22C, 23C situated at different heights.

To this end, each groove 31 in each cheek 30 has a generally S-shaped curved path with two adjacent and opposite curves 31A, 31B so that a first portion of the groove 31 is at the same level as the groove 21D, 22D in the rim 21C, 22C of the corresponding longitudinal wall 21, 22 and a second portion of the groove 31 in the cheek is at the same level as the groove 23D in the rim 23C of the corresponding longitudinal wall 23 (see FIGS. 1 and 3).

The members on the rim of each cheek 30 for mounting a length of cover section 50 include clipping members for the length of cover section 50 identical to the clipping members on the rims 21C, 22C, 23C of the longitudinal walls 21, 22, 23 constituting the lateral flanges of the base section 20 of the trunking 10.

The clipping members for each cheek 30 include a clipping bead 31C which ensures a continuity of clipping beads between the clipping beads 21E, 22E, 23E on the rims 21C, 22C, 23C situated at different heights.

The clipping bead 31C on each cheek 30 is on the external edge of the groove 31. It therefore follows the same curved path as the groove, i.e. an S-shaped path with two adjacent and opposite curves 31A, 31B.

Each cheek 30 comprises a panel with a particular height which, in the embodiment shown in FIGS. 1 to 3, covers the heights of the longitudinal walls 21, 22, 23 constituting the lateral flanges of the base section 20 of the trunking 10, with its lengths having different heights, so that each cheek 30 conceals the step formed between two longitudinal walls 21, 23 and 22, 23 with different heights and the junction between the two longitudinal walls 21, 23 and 22, 23 with different heights.

In the case of a range of trunking with several different heights, the height of each cheek 30 can advantageously be modifiable by cutting off a portion of the panel thereof along a particular cutting line so as to be able to adapt the height of each cheek to that of the lateral flanges of lengths of trunking with different heights, so that each cheek entirely conceals the joint at the junction of two longitudinal walls of different heights constituting a corresponding lateral flange of the trunking.

Each cheek 30 advantageously includes members for mounting it on the lateral flanges of the base section 20 of the trunking, in this example on the longitudinal walls 21, 22, 23 that constitute the lateral flanges of the base trunking 20. These mounting members are positioned head-to-tail with the mounting members 31, 31C of a length of cover section and are identical to the members for mounting a length of cover section 50 on the rims 21C, 22C, 23C of the longitudinal walls 21, 22, 23 of the base section 20 of the trunking 10.

The mounting members on the cheeks 30 include an engagement tongue 33 adapted to be engaged in the grooves 21D, 23D and 22D, 23D in the rims 21C, 23C and 22C, 23C of the longitudinal walls 21, 23 and 22, 23 and, parallel to the engagement tongue 33, a clipping tongue 34 adapted to clip over the clipping beads 21E, 23E and 22E, 23E on the longitudinal walls 21, 22, 23 forming the lateral flanges of the base section 20 of the composite trunking 10.

To this end, the engagement tongue 33 and the clipping tongue 34 on each cheek 30 follow the same curved path as the groove 31 in the rim thereof.

The engagement tongue 33 and the clipping tongue 34 of each cheek 30 extend in a direction opposite to that in which the groove 31 of the cheek 30 opens and are attached to an external rim of the groove 31 by a heel-piece 32 that extends the external rim.

Accordingly, as shown in FIG. 3 in particular, the accessory conforming to the invention previously described advantageously produces trunking 10 with a locally increased height corresponding to the height of the longitudinal walls 23, for example to allow the installation of an electrical device in the trunking without encroaching on its interior volume intended for the wiring.

FIG. 3, which shows the trunking when closed, shows diagrammatically the position of the electrical device in question, which is placed in the length of trunking of greater height and closed by an embellisher plate 1.

The base section 20 of the trunking 10 is advantageously closed continuously by a length of cover section 50 that closes the lengths with different heights and the step formed between them, following, at the junction of the two lengths, the curved path with two adjacent and opposite curves 31A, 31B of the mounting members 31, 31C on each cheek 30 with no crease or exposed edge.

Figure 4:
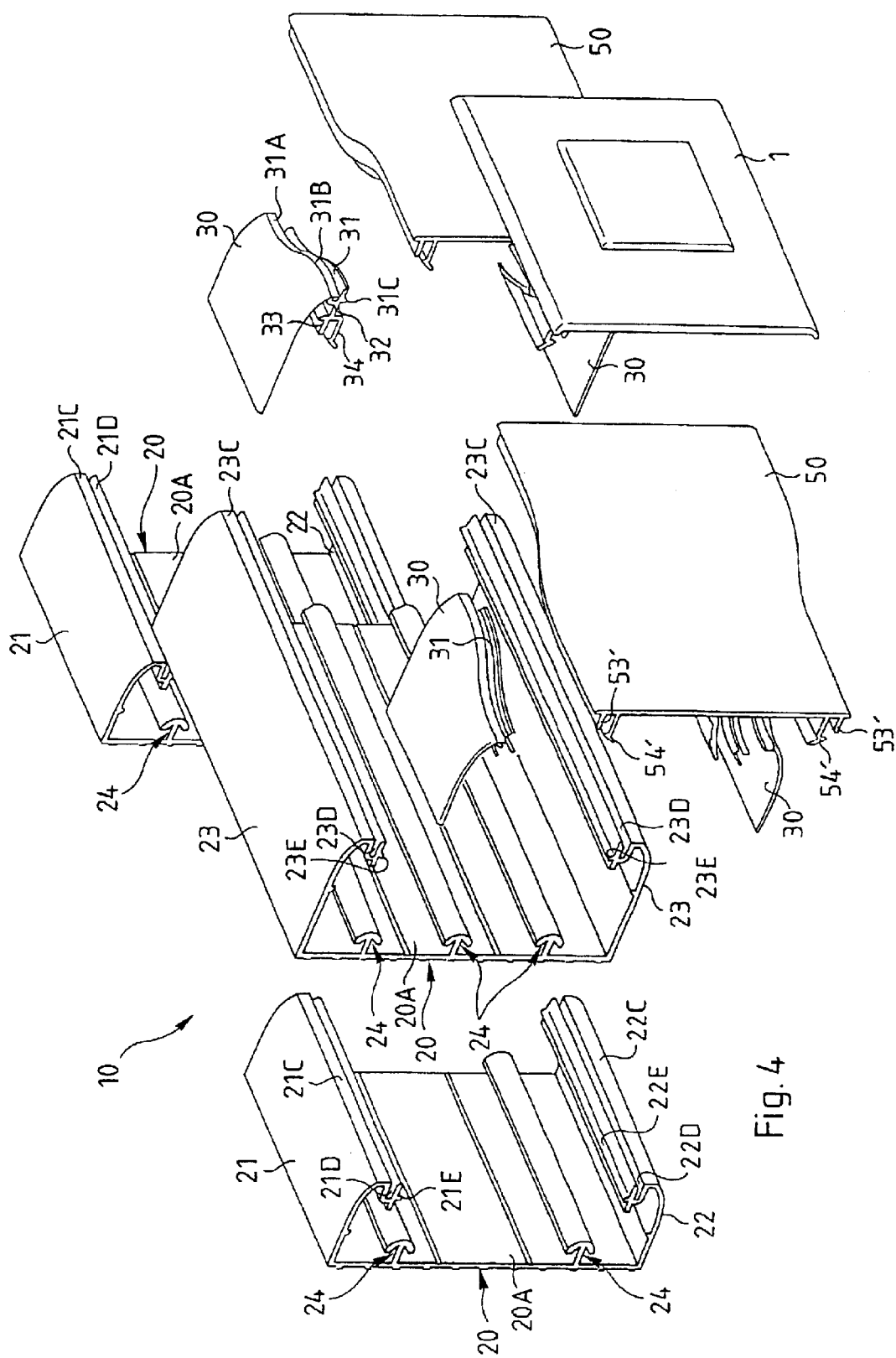
FIG. 4 is a diagrammatic exploded perspective view of a second embodiment of trunking fitted with the accessory shown in FIG. 2.
Figure 5:
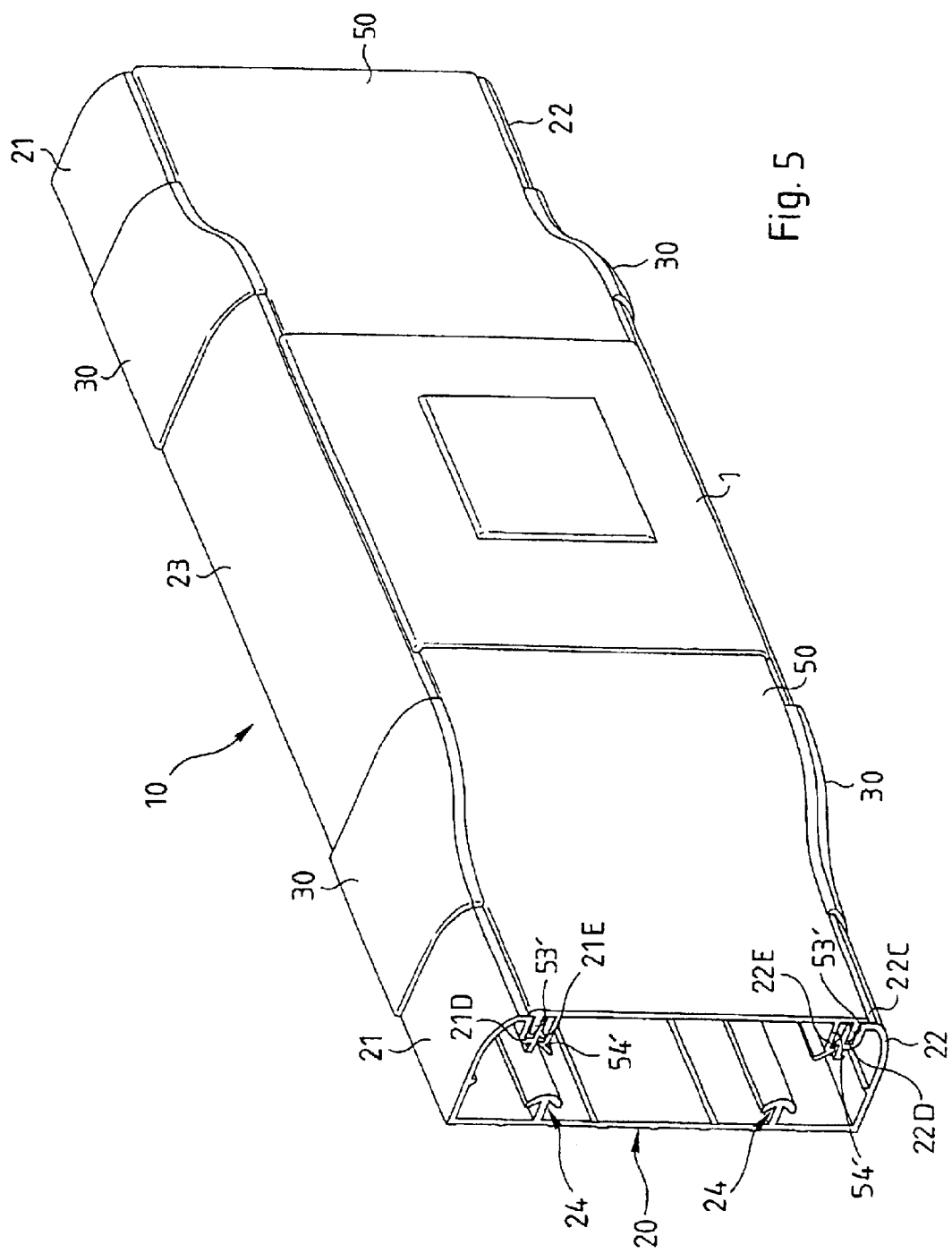
FIG. 5 is a perspective view of the trunking shown in FIG. 4 when assembled.

FIGS. 4 and 5 show a different embodiment of the trunking 10 shown in FIGS. 2 and 3 whereby the trunking 10 is made up of a plurality of juxtaposed lengths of one-piece cover section.

To this end it includes two one-piece base sections 20 having a first height and whose lateral flanges 21, 22 are in one piece with the back 20A of the base section and, between the two one-piece base sections 20 having a first height, a third one-piece base section 20 having a second height greater than the first height. This second one-piece base section 20 has two lateral flanges 23 whose height is greater than that of the lateral flanges 21, 22 of the first two base sections 20.

As shown in FIG. 4 in particular, each base section 20 has on its back 20A longitudinal ribs 24 identical to those on the back 20A of the base section 20 of the trunking 10 shown in FIGS. 2 and 3. Separating or dividing partitions (not shown) can be attached to these ribs to divide the interior volume of the base section 20 into a plurality of compartments.

Each lateral flange of the juxtaposed base sections 20 of the trunking 10 shown in FIGS. 4 and 5 includes members for mounting a length of cover section 50 identical to those of the longitudinal walls 21, 22, 23 of the trunking 10 shown in FIGS. 2 and 3. For this reason these mounting members are not described again.

The lengths of cover section 50 for closing the base sections 20 of the various lengths of the trunking 10 are identical to those shown in FIGS. 1 to 3 and are not described again.

The trunking 10 includes a double accessory identical to that shown in FIGS. 2 and 3 and is not described in detail again.

Each accessory establishes continuity at each pair of juxtaposed base sections 20 with different heights, each cheek 30 establishing a continuous wall between the juxtaposed lateral flanges 21, 23; 22, 23 with different heights and continuity between the members 21D, 21E, 22D, 22E, 23D, 23E for mounting a length of cover section provided on the rims 21C, 23C; 22C, 23C of said lateral flanges 21, 23; 22, 23 situated at different heights.

Once closed, the trunking 10 shown in FIG. 5 has exactly the same external appearance as the trunking shown in FIG. 3.

Figure 13:
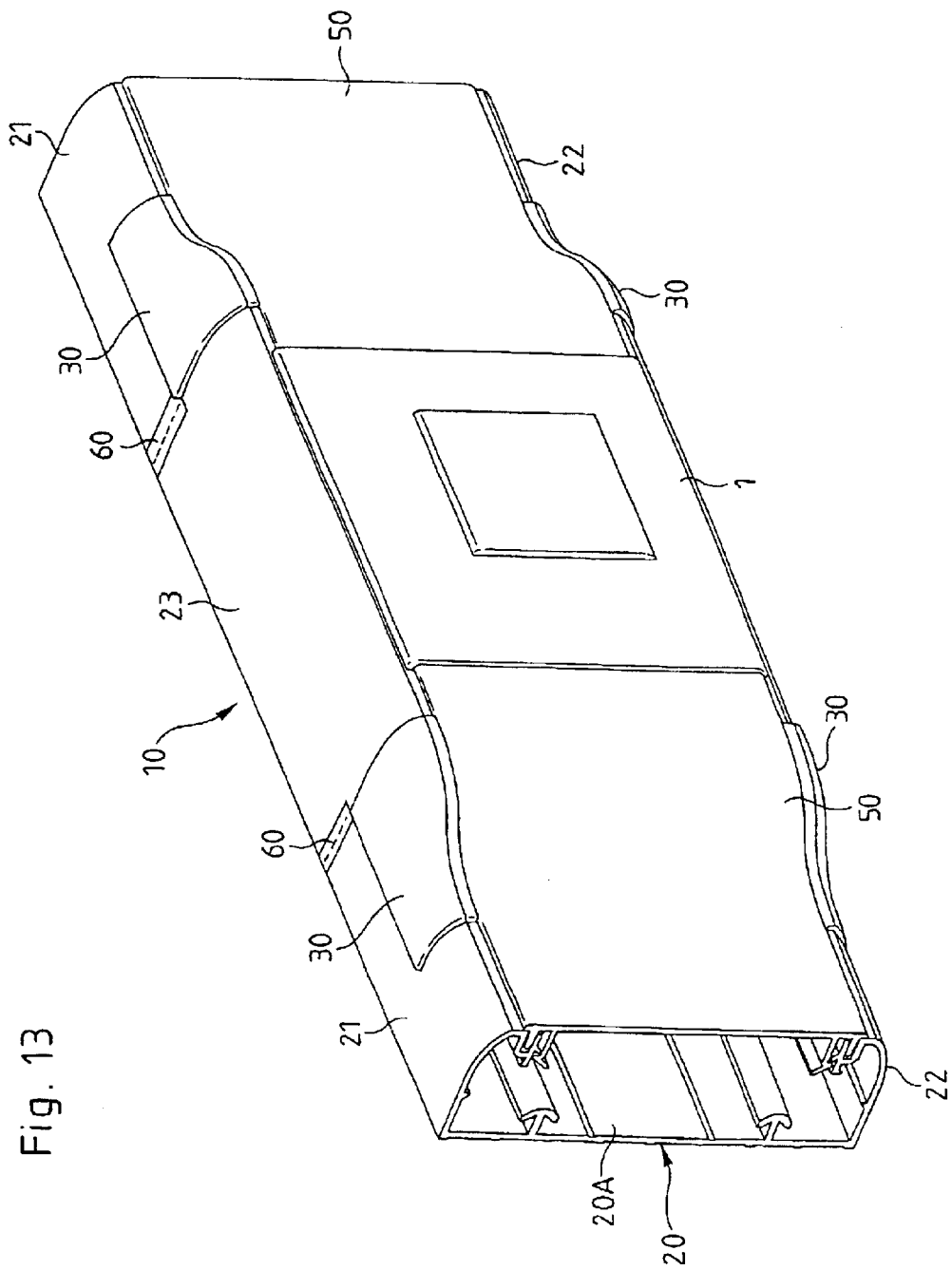
FIG. 13 is a perspective view of the trunking shown in FIG. 5 with a different embodiment of the accessory according to the invention when assembled.

FIG. 13 shows a variant of the trunking 10 fitted with its double accessory, as shown in FIG. 5, where the cheeks 30 of the accessory have a height less than the height of the lateral flanges 21, 22, 23 of the juxtaposed base sections 20.

In this case, each cheek 30 covers the step formed between the lateral flanges of different heights and a portion of the joint formed between the lateral flanges 21, 23 of the base sections 20 of different heights, the other portion of the joint remaining visible and extending under each cheek. To conceal the visible part of the joint, it then suffices to fix a masking strip 60 to the exterior surfaces of the lateral flanges 21, 22, 23 of the base sections 20, for example using an adhesive.

Figure 6:
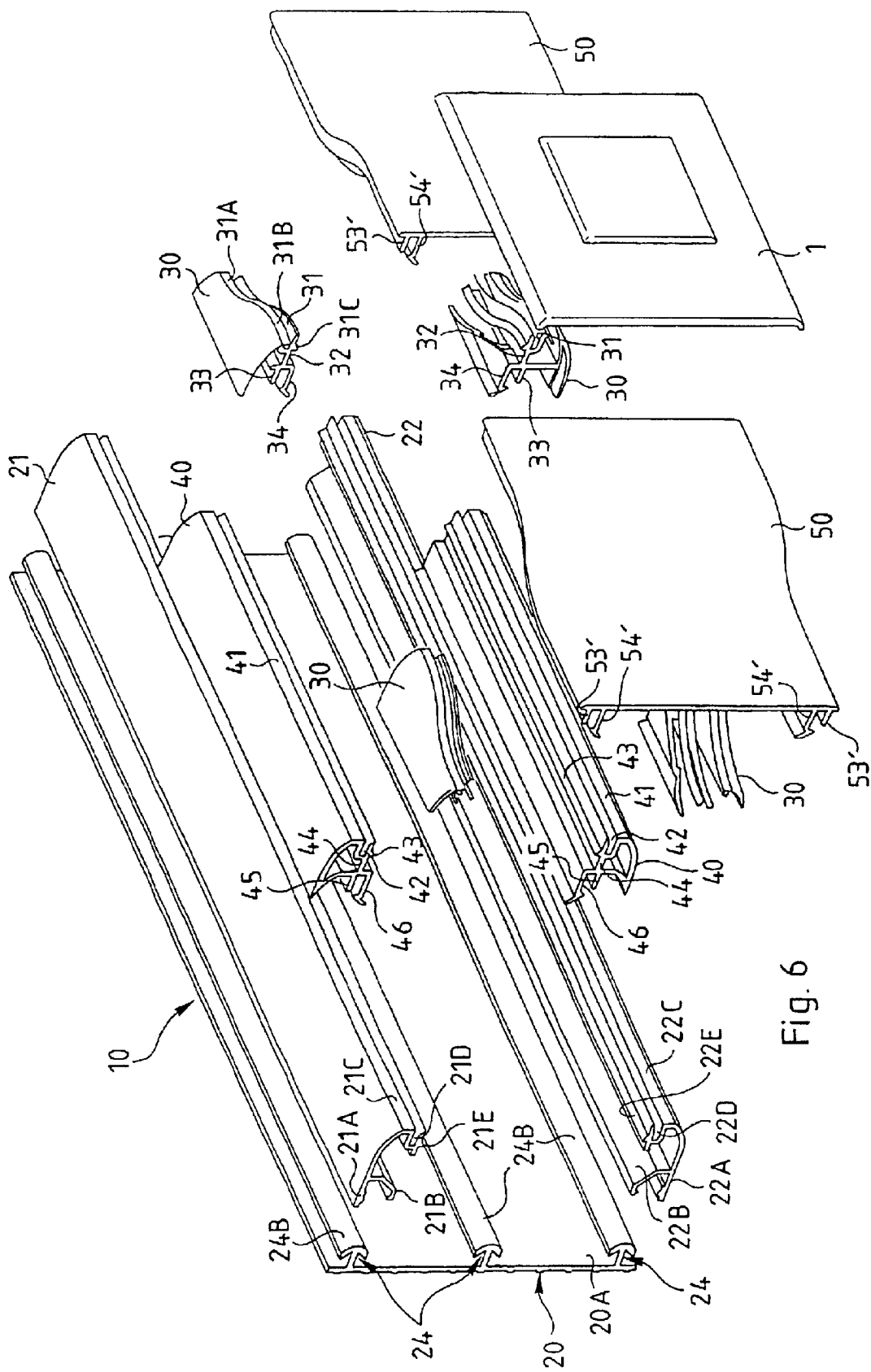
FIG. 6 is a diagrammatic exploded perspective view of a third embodiment of trunking fitted with a different embodiment of the accessory according to the invention.
Figure 7:
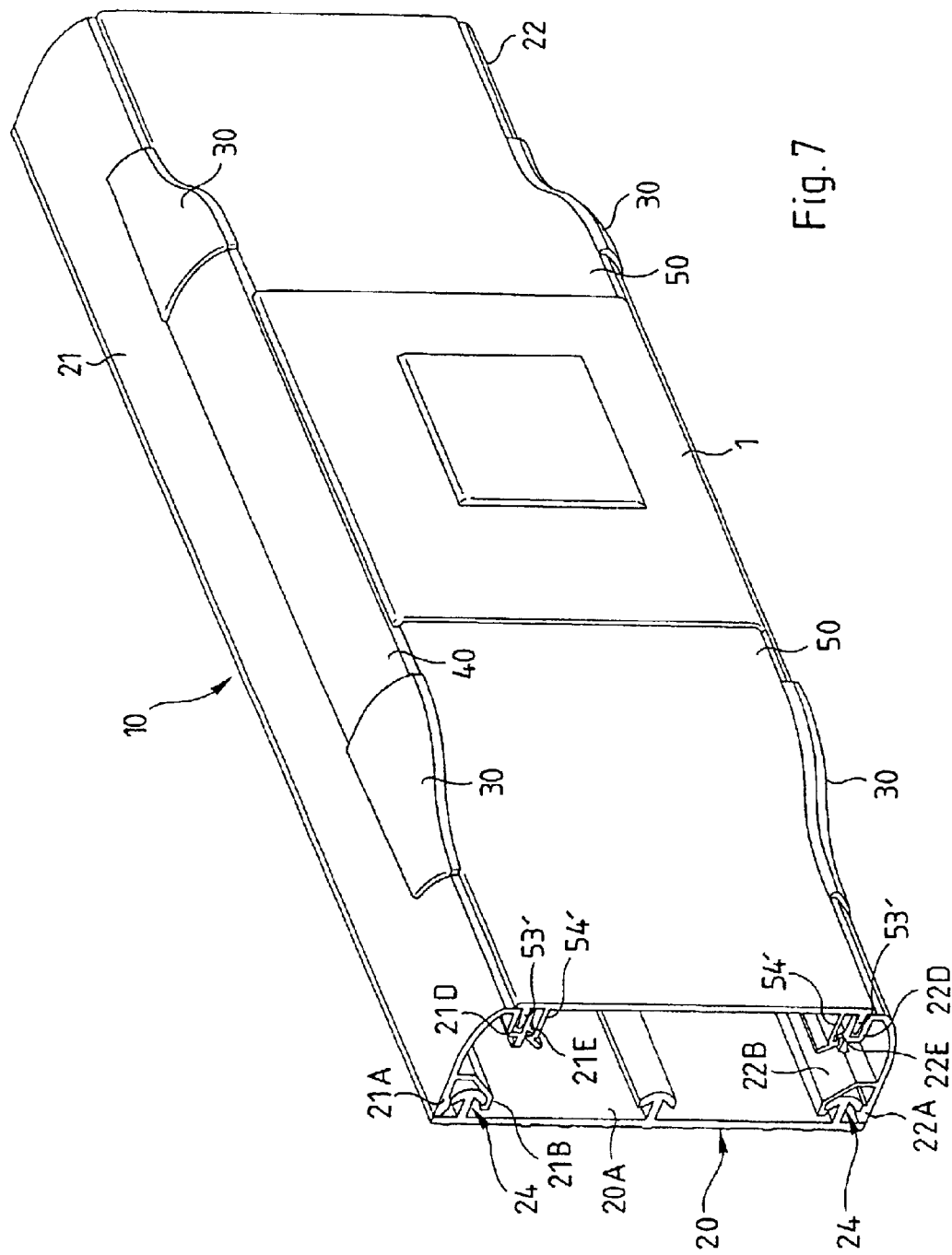
FIG. 7 is a perspective view of the trunking shown in FIG. 6 when assembled.
Figure 8:
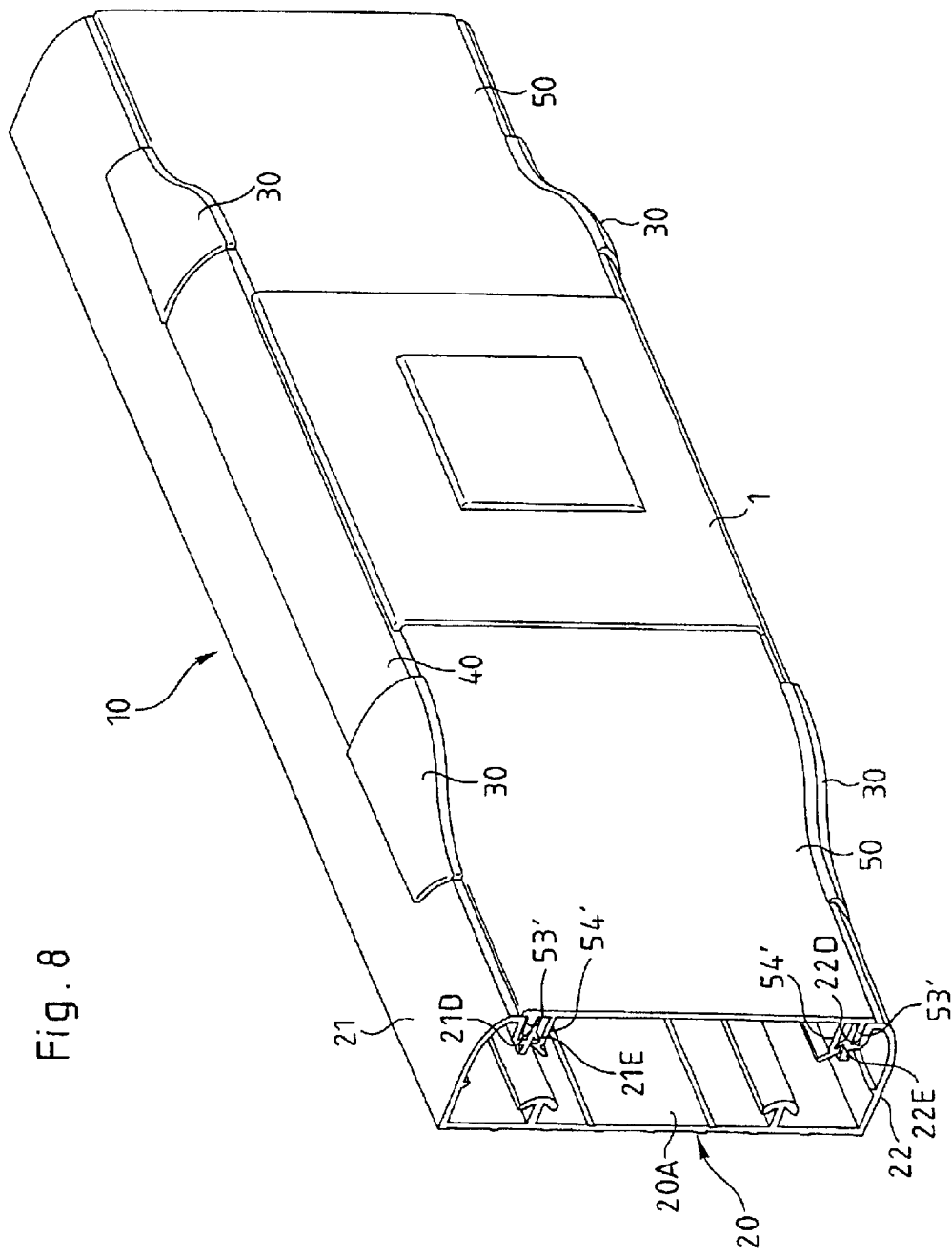
FIG. 8 is a perspective view of a different embodiment of the trunking shown in FIG. 7 and incorporating the accessory shown in FIG. 7 when assembled.

FIGS. 6 to 8 show another embodiment of the trunking 10, which includes a base section 20 with two lateral flanges 21, 22 whose rims 21C, 22C are directed toward each other.

The base section 20 shown in FIGS. 6 and 7 is a composite base section comprising a back 20A on which are mounted longitudinal walls 21, 22 constituting the lateral flanges of the base section.

The base section 20 shown in FIG. 8 is a one-piece base section with lateral flanges 21, 22 in one piece with the back 20A.

The longitudinal walls 21, 22 of the composite base section 20 include members for mounting them on the back 20A that are identical to the mounting members on the longitudinal walls 21, 22, 23 of the base section 20 shown in FIG. 1 and are not described again.

Apart from the aforementioned difference, the base sections 20 shown in FIGS. 6, 7 and 8 are identical.

Each lateral flange 21, 22 of each base section 20 has mounting members on its rim which are identical to the mounting members on the rims of the longitudinal walls 21, 22, 23 constituting the lateral flanges of the base section 20 shown in FIGS. 1 and 2.

The trunking 10 shown in FIGS. 6 to 8 includes an accessory comprising two height extenders 40 each provided with members for mounting it on a lateral flange 21, 22 of the base section 20 of the trunking 10 to increase the height of the lateral flange 21, 22 and form locally a length of trunking of greater height than the base section 20.

Of course, the two height extenders 40 are mounted on the two lateral flanges 21, 22 of the base section 20 in positions facing each other.

The members for mounting a length of cover section provided on the rim 41 of each height extender 40 are identical to the members for mounting a length of cover section provided on the rims 21C, 22C of the lateral flanges 21, 22 of the base section 20 of the trunking 10.

To this end, the mounting members include, in the rim 41 of each height extender 40, a rectilinear groove 42 bordered by an external rim which carries a clipping bead 43 that runs along the groove 42.

When fitting the length of cover section 50 to the greater height length of the base section 20 of the trunking 10, each longitudinal engagement tongue 53' of the length of cover section 50 is engaged in a groove 42 in a height extender 40 and each longitudinal clipping tongue 54' of the length of cover section 50 clips onto a corresponding clipping bead 43 on the height extender 40.

The accessory shown in FIGS. 6 to 8 also includes cheeks 30 identical to those shown in FIGS. 1 to 5 and adapted to be mounted on the lateral flanges 21, 22 and on the height extenders 40 so that each cheek 30 establishes a continuous wall between a lateral flange 21, 22 of the base section 20 of the trunking 10 and a height extender 40, masking the step formed between the lateral flange and the height extender, and establishing continuity between the members for mounting a length of cover section 50 on a rim of a height extender 40 and the members for mounting a length of cover section 50 on a rim of a lateral flange 21, 22 situated at different heights (see FIG. 8).

The mounting members provided on each height extender 40 for mounting it on a lateral flange 21, 22 of the base section 20 are positioned head-to-tail with the members 42, 43 for mounting the height extender 40. They include a longitudinal engagement tongue 45, adapted to be engaged in the groove 21D or in the groove 22D in the lateral flange 21 or the lateral flange 22 of the base section 20 of the trunking, and a longitudinal clipping tongue 46, parallel to the longitudinal engagement tongue 45 and adapted to clip onto the clipping bead 21E or the clipping bead 22E on the lateral flange 21 or the lateral flange 22 of the base section 20 of the trunking.

The engagement tongue 45 and clipping tongue 46 of each height extender 40 are connected to the groove 42 thereof by a heel-piece 44 which extends from the external rim of the groove 42 in the direction of the engagement tongue 45 and the clipping tongue 46.

Thus each cheek 30 mounted on a lateral flange 21, 22 of the base section 20 establishes a continuous wall between each lateral flange and each height extender and a continuous groove between the groove 21D, 22D in the corresponding lateral flange 21, 22 and the groove 42 in the corresponding height extender 40 attached to the lateral flange.

Each cheek 30 establishes a continuous clipping bead from the clipping bead 21E, 22E on the corresponding lateral flange 21, 22 to the clipping bead 43 on the height extender 40 attached to the lateral flange.

Accordingly, in this embodiment, by fitting a height extender 40 and the cheeks 30 to a base section 20 of constant height, there is obtained trunking having a length of a first height and a juxtaposed length of a greater second height, the second height corresponding to the height of the lateral flange of the base section plus that of the height extender attached to the lateral flange.

The continuity between the members for mounting a length of cover section is ensured by the cheeks 30 attached to the lateral flanges 21, 22 and the corresponding height extenders 40 of the base section 20 of the trunking 10, with the result that the length of cover section 50 can be mounted on the lengths of trunking with different heights along the curved path of the groove 31 on each cheek, to close each of the juxtaposed lengths and the step formed at the junction between them, with no crease or exposed edge.

Figure 9:
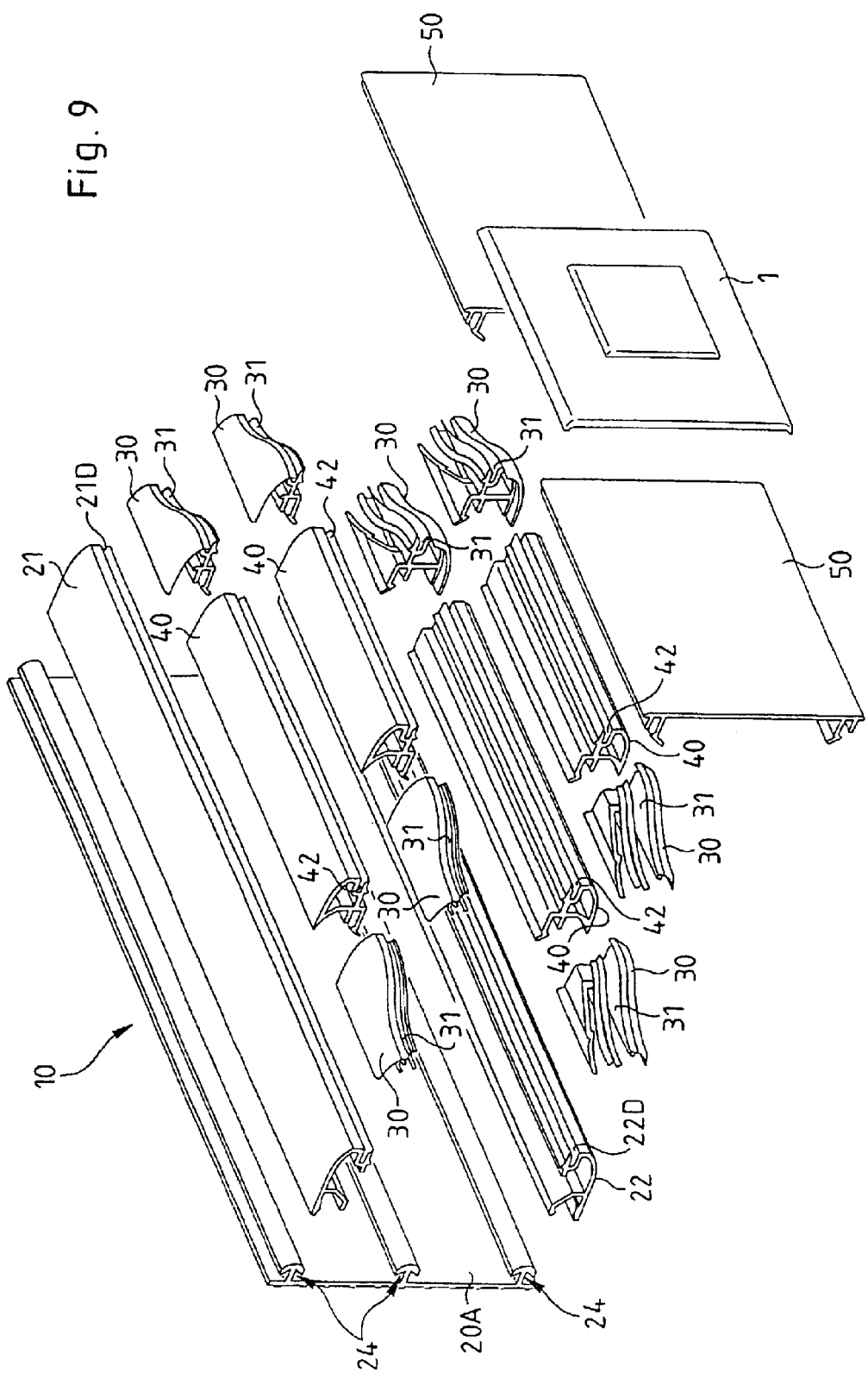
FIG. 9 is a diagrammatic exploded perspective view of the trunking shown in FIG. 6 provided with a different embodiment of the accessory according to the invention.

FIG. 9 shows trunking 10 identical to that shown in FIGS. 6 and 7 fitted with an accessory of the same type as that shown in FIGS. 6 and 7 and including, for each lateral flange 21, 22 of the trunking, a plurality of height extenders 40 with different lengths; in this example there are two height extenders 40 with different lengths for each lateral flange 21, 22 of the base section 20 of the trunking 10.

The height extenders 40 with different lengths of each pair are adapted to be mounted one on the other to form a height extender wall of generally pyramidal shape, forming a step at each junction between a first height extender 40 and a shorter second height extender 40.

The height extenders 40 are identical except for their different lengths. This means that they have on one side the same members for mounting them on a lateral flange 21, 22 of the base section 20 of the trunking 10 and on the other side the same members for mounting a length of cover section 50.

Stacking height extenders with different lengths means that the base section 20 of the trunking can be locally increased in height even more, by increasing the height of each individual lateral flange 21, 22 of the base section, for example to accommodate an electrical device of greater overall size than that shown in the trunking represented in FIGS. 6 to 8.

The accessory shown in FIG. 9 includes, in addition to the plurality of height extenders 40 with different lengths, a plurality of cheeks 30 identical to that shown in the preceding figures; each cheek 30 is adapted to establish continuity between two successive height extenders 40 with different lengths or between the lower height extender 40 mounted on the corresponding lateral flange 21, 22 of the base section 20 of the trunking and the lateral flange 21, 22, filling in the step formed at the junction of the stacked height extenders or at the junction of the height extender and the corresponding lateral flange.

When a cover section 50 is mounted on the base section 20 of the trunking 10, it follows a curved path with a double S-shape along the successive curved lines of the rims of the various cheeks attached at the junction between the two successive height extenders and at the junction between a height extender and a lateral flange, and thus closes continuously and without creases or exposed edges the cascade of steps formed between the two juxtaposed lengths of trunking with different heights and a portion of each of the lengths of trunking themselves.

Figure 10:
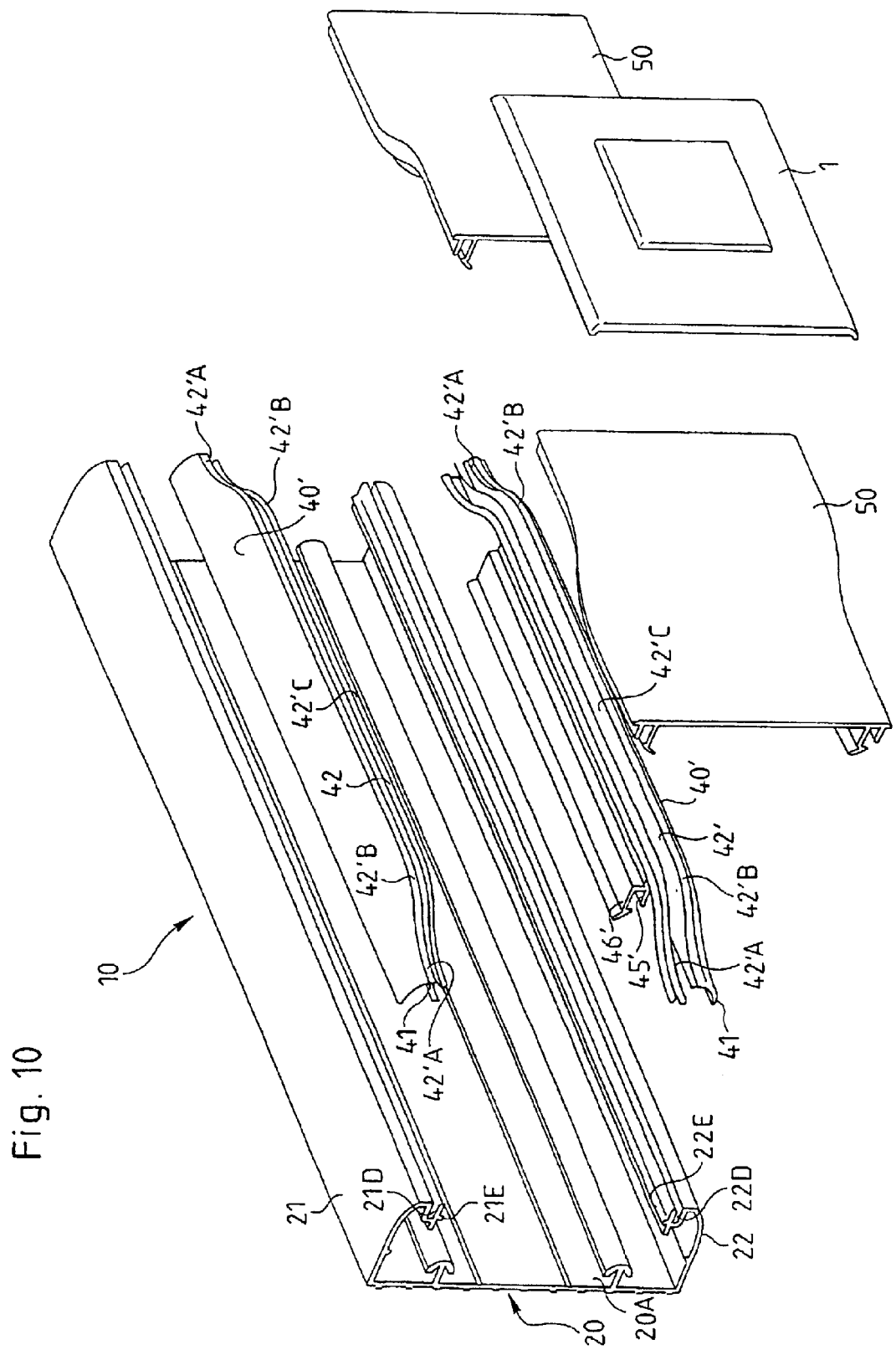
FIG. 10 is an exploded perspective view of trunking including a one-piece base section fitted with another embodiment of the accessory according to the invention.
Figure 11:
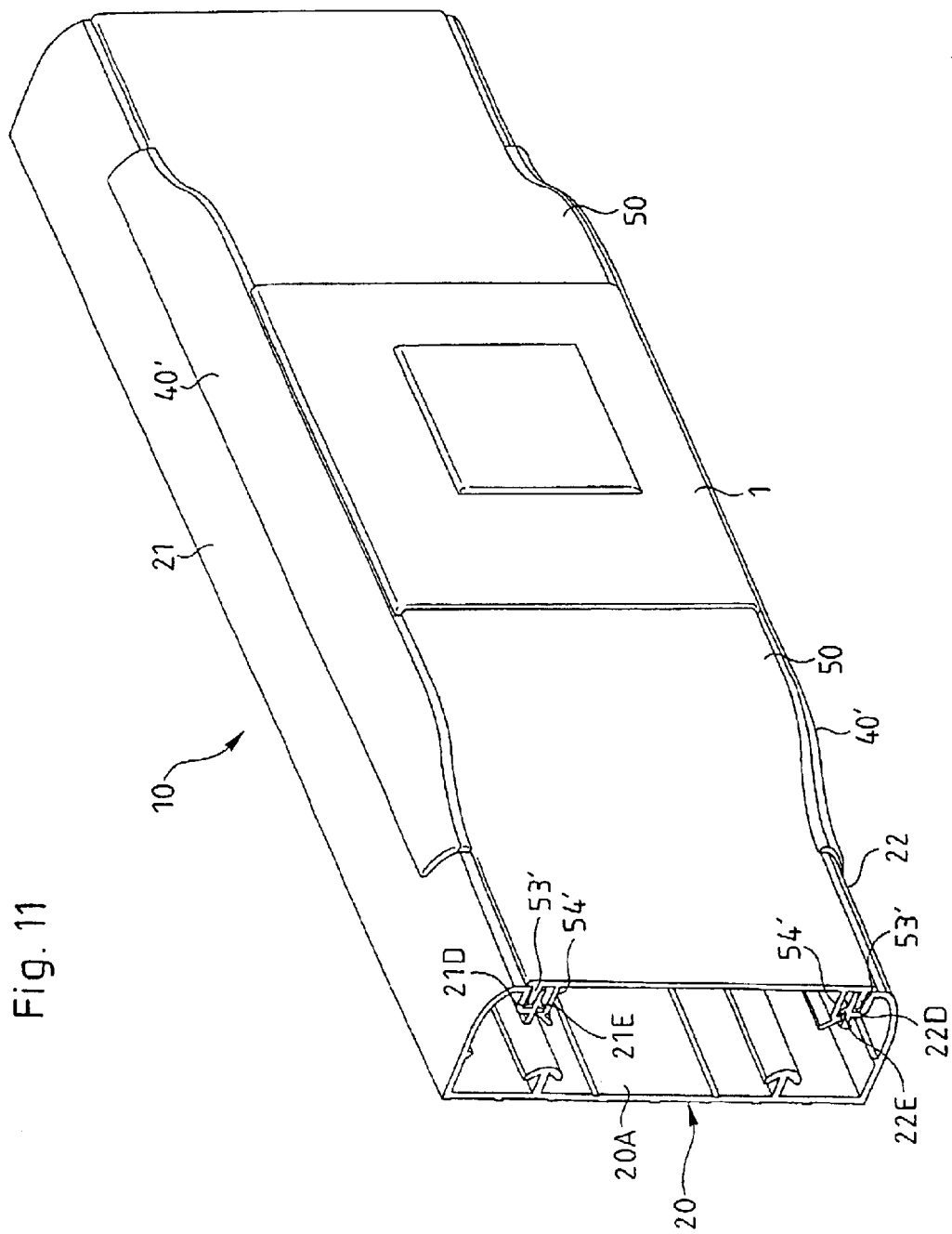
FIG. 11 is a perspective view of the trunking shown in FIG. 10 when assembled.
Figure 12:
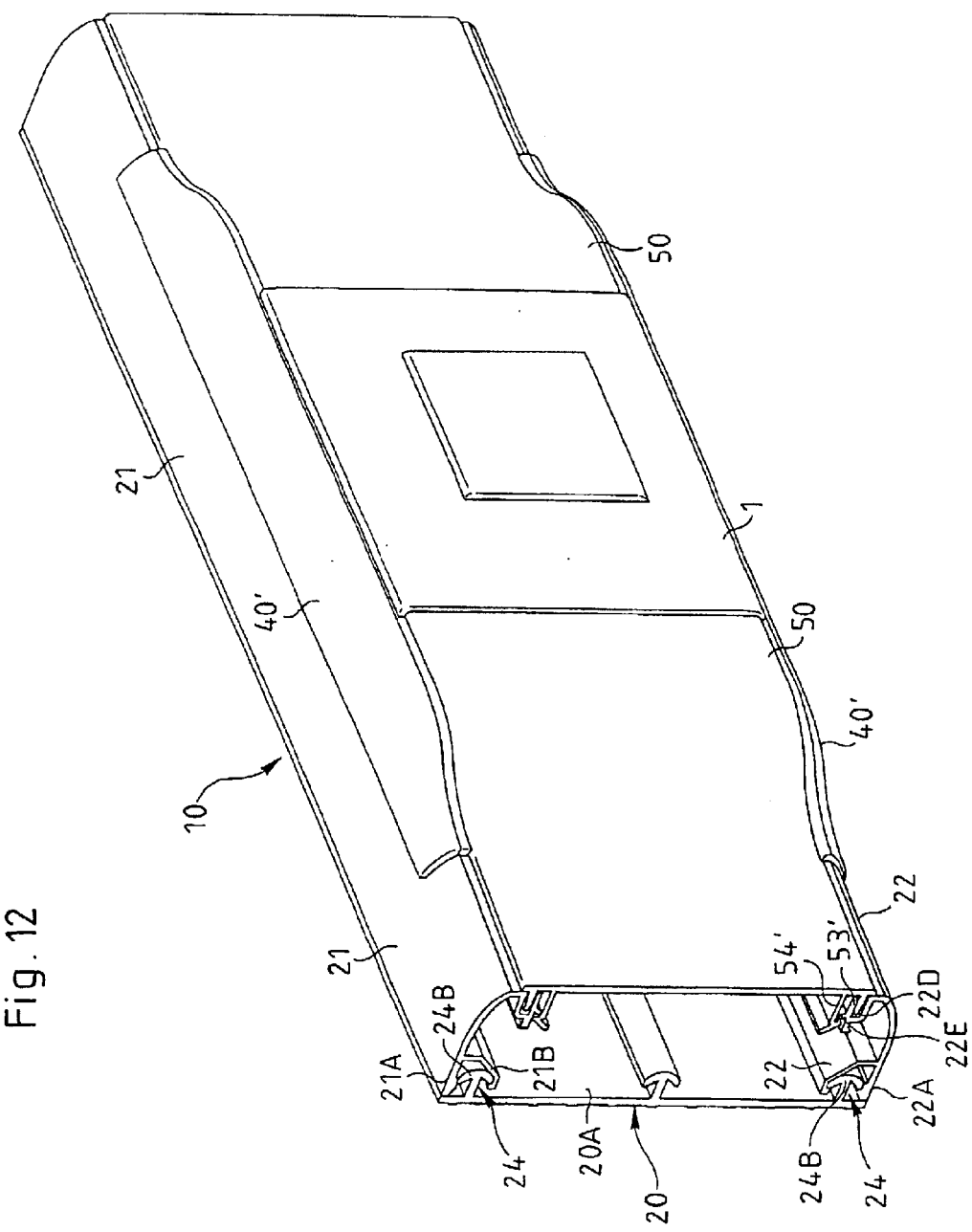
FIG. 12 is a perspective view of a composite version of the trunking shown in FIG. 11 and incorporating the accessory shown in FIG. 11 when assembled.

FIGS. 10 and 11 show trunking 10 whose base section 20 is identical to that shown in FIG. 8, and FIG. 12 shows composite trunking 10 whose base section 20 is identical to that shown in FIGS. 6 and 7.

The trunking 10 shown in FIGS. 10 to 12 incorporates a different embodiment of the accessory according to the invention, which includes a cheek 40' adapted to be attached to each of the lateral flanges 21, 22 of the base section 20 and forming, in one piece, a height extender of the type used in the embodiments shown in FIGS. 6 to 8 and, at each end thereof, a cheek of the type used in the previous embodiments.

Accordingly, each cheek 40' includes members for mounting a length of cover section 50 that extend along a line having two adjacent reversed curves 42'A, 42'B at each end and, between its two ends, a rectilinear path 42'C and members 45', 46' for mounting it on a lateral flange 21, 22 of the base section 20 of the trunking 10 to increase the height of the lateral flange and to form locally a length of trunking of greater height than the base section 20 of the trunking 10, providing continuity of the members for mounting a length of cover section between the two heights of the lengths of trunking.

The members for mounting a length of cover section on each cheek 40' include a groove 42' in a rim on the cheek 40' bordered by a clipping bead.

The members for mounting each cheek 40' on a lateral flange 21, 22 of the base section 20 of the trunking 10 are identical to the members for mounting the height extender 40 shown in FIGS. 5 and 6 and include a longitudinal engagement tongue 45' and a longitudinal clipping tongue 46' which are parallel to each other and positioned head-to-tail with the members 42' on each cheek 40' for mounting a length of cover section 50.

Another variant of the accessory according to the invention, not shown in the figures, includes another cheek adapted to establish a continuous wall between two dividing partitions with different heights attached to the longitudinal ribs 24 carried by the back 20A of each base section 20 of the trunking 10, this other cheek including a strip providing a continuous wall between rims of the dividing partitions, not shown, in which are mounted the lengths of cover section for closing the compartments of each base section, the strip including members for mounting the lengths of cover section extending along a line having at least two adjacent and opposite curves to establish continuity between the members for mounting a length of cover section situated at different heights and to close the step formed between the lengths of cover section with different heights and a portion of each pair of butt-jointed compartments of the lengths of trunking, using a single length of cover section and with no interruption or visible edge or crease at the location of the step.

Finally, the trunking accessory according to the invention can be used to produce trunking for routing optical fibers.

To make a corner in trunking adapted to receive optical fibers, it is possible to increase the height of the trunking locally, on approaching the corner, by means of the accessory according to the invention, and to use a standard corner accessory designed for a larger size of trunking. Then, on the far side of the corner in the trunking, using another accessory according to the invention, the trunking can return to a lower height, identical to that of the trunking upstream of the corner.

Thus it is no longer necessary to provide dedicated accessories for corners in trunking for routing optical fibers.

Figure 15:
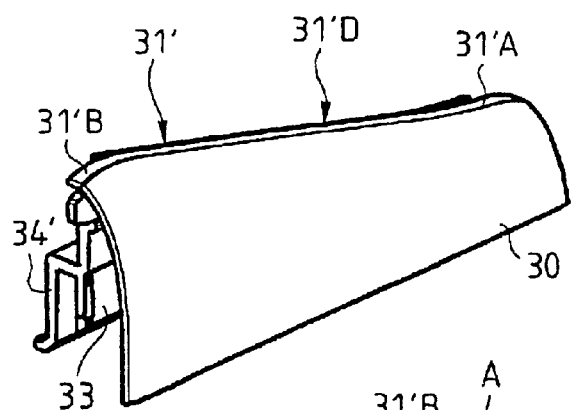
FIG. 15 is a perspective view of a different embodiment of the accessory according to the invention.
Figure 16:
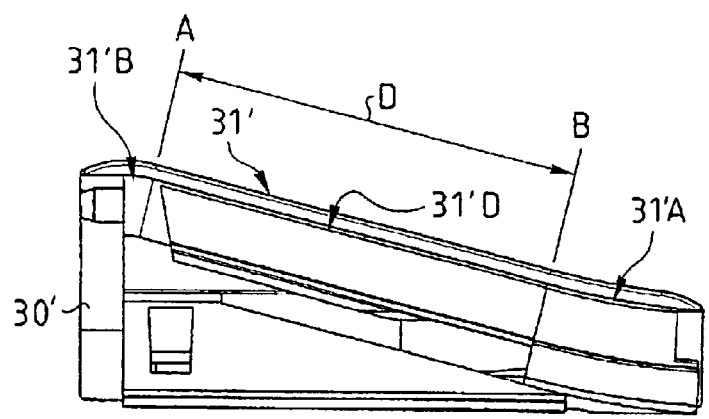
FIG. 16 is a rear view of the accessory shown in FIG. 15.

FIGS. 15 and 16 show a cheek 30' of a different embodiment of the accessory according to the invention.

Like the cheek 30, the cheek 30' includes members for mounting it on the lateral flanges of the base section of the trunking. The mounting members include an engagement tongue 33' adapted to be engaged in the grooves in the rims of the longitudinal walls that constitute the lateral flanges of the base section and, parallel to the engagement tongue 33', a clipping tongue 34' adapted to clip over clipping beads on the longitudinal walls.

Each cheek 30' of this embodiment of the accessory according to the invention includes members for mounting it on a length of cover section that extend along a line which in this example has two opposite curves 31'A, 31'B separated from each other by a rectilinear portion 31'D to establish continuity between the members for mounting a length of cover section situated at two different heights; thus said accessory allows mounting, on said cheeks 30', of a length of cover section adapted to close the base section of the trunking to close the step formed between the juxtaposed lengths with different heights and a portion thereof using a single length of cover section and with no interruption or exposed edge or crease at the location of the step.

The rectilinear portion 31'D that the mounting members follow on from extends over a distance D between the points A and B marked in FIG. 16.

The members for mounting the length of cover section are substantially identical to those provided for the cheeks 30 previously described, i.e. they include engagement members comprising a groove 31' which provides continuity between their grooves and the grooves on the rims of the lateral flanges situated at different heights.

In this embodiment, each groove 31' has a path with a stretched S-shape so that a first portion 31'A of the groove 31' is at the level of the groove in the rim of the corresponding longitudinal wall and a second portion 31'B of the groove 31' in the cheek 30' is at the same level as the groove in the rim of the corresponding longitudinal wall.

The present invention is in no way limited to the embodiments described and shown, many variants of which will be evident to the skilled person.

What is claimed is:

1. A trunking accessory for making up composite trunking comprising two or more juxtaposed trunking lengths with different heights and a step therebetween and including a base trunking section having two opposed lateral flanges with flange rims directed toward each other, each flange rim including a first mounting member for mounting a length of cover section, wherein said accessory includes two or more cheeks adapted to be attached to said lateral flanges, and each of said cheeks includes a second mounting member for mounting a length of cover section that extends along a path having at least two opposite curves to establish continuity between said first mounting members for mounting a length of cover section situated at two different heights so that the step between said juxtaposed trunking lengths with different heights and adjoining portions of the trunking lengths can be closed by a single length of cover section with no interruption or visible edge or crease at the location of said step.

2. The accessory claimed in claim 1 wherein said opposite curves are adjacent.

3. The accessory claimed in claim 1 wherein said opposite curves are separated from each other by a rectilinear portion.

4. The accessory claimed in claim 1, for establishing continuity between two trunking lengths having different heights, wherein each of said trunking lengths includes a said base section having two said lateral flanges, wherein each of said cheeks includes third mounting members for attaching the corresponding cheek to said base trunking sections at a junction of two juxtaposed lateral flanges of different heights to ensure continuity between said lateral flanges.

5. The accessory claimed in claim 1 further comprising at least two height extenders, each height extender having an extender rim including a fourth mounting member for mounting a length of cover section and a fifth mounting member for mounting the corresponding height extender on one of said lateral flanges of said base trunking section to locally form a trunking length of greater height than said base trunking section, said cheeks including a third mounting member for mounting them on said lateral flanges and on said height extenders so that each cheek establishes continuity between one of said lateral flanges of said base trunking section and one of said height extenders and continuity between the fourth mounting member for mounting a length of cover section on said extender rim on one of said height extenders and the first mounting member for mounting a length of cover section on said flange rim on one of said lateral flanges situated at different heights.

6. The accessory claimed in claim 5 wherein there are a plurality of said height extenders with different lengths adapted to be stacked to form a height extender wall of globally stepped pyramidal shape with a first step formed at each junction between a first of said plurality of height extenders and a second of said plurality of height extenders of shorter length, said height extender wall comprising a sixth mounting member for mounting a length of cover section and a seventh member for mounting height extender wall on one of said lateral flanges of said base trunking section to increase the height of said lateral flange, other cheeks adapted to establish continuity between two successive ones of said plurality of height extenders with different lengths.

7. The accessory claimed in claim 1 wherein each of said cheeks comprises a said second mounting member for mounting a length of cover section that extend along a path having two opposite curves at its ends and a rectilinear portion therebetween and a said second member for mounting the corresponding cheek on one of said lateral flanges of said base trunking section to increase the height of said lateral flange and locally form a trunking length of greater height than said base trunking section, ensuring a continuity of the first mounting members for mounting a length of cover section between the two heights of said trunking lengths.

8. The accessory claimed in claim 1 including another cheek adapted to establish a continuous wall between two dividing partitions with different heights attached to the back of each base section of said trunking, wherein said other cheek includes a strip ensuring a continuous wall between rims of said dividing partitions in which are mounted the length of cover section for closing the compartment of each base section.

9. The accessory claimed in claim 1 wherein said second mounting member for mounting a length of cover section provided on each of said cheeks is substantially identical to the first mounting members for mounting a length of cover section provided on said flange rims of said lateral flanges or partition rims of dividing partitions of each said base trunking section.

10. The accessory claimed in claim 5 wherein a said fourth mounting member for mounting a length of cover section provided on each of said height extenders is substantially identical to the first mounting members for mounting a length of cover section provided on the flange rims of said lateral flanges of said base trunking section.

11. The accessory claimed in claim 1 wherein said second mounting member for mounting a length of cover section includes an engagement member for engaging said lengths of cover section.

12. The accessory claimed in claim 11 wherein said engagement member on each of said cheeks includes a groove which ensures continuity of flange grooves provided on said flange rims situated at different heights.

13. The accessory claimed in claim 1 wherein said members provided on each cheek for mounting a length of cover section include clipping members for clipping said length of cover section.

14. The accessory claimed in claim 13 wherein said clipping members include, for each of said cheeks, a clipping bead for ensuring continuity with clipping beads provided on said flange rims at different heights.

15. The accessory claimed in claim 1 wherein said members for mounting cheeks on said lateral flanges of said base section of said trunking are identical to the members for mounting a length of cover section on said flange rims of said lateral flanges of said base section of said trunking.

16. The accessory claimed in claim 5 wherein said fifth mounting members for mounting said height extender on said lateral flange of said base trunking section are substantially identical to said first members for mounting a length of cover section on said flange rims of said lateral flange of said base trunking section.

17. The accessory claimed in claim 1 wherein each cheek has a height that can be modified by cutting off a portion thereof along a particular cutting line to adapt the height of each cheek to those of said lateral flanges of lengths of trunking with different heights.

* * * * *